(No Model.)

A. K. MUNSON.
Neck Yoke.

No. 230,328.  Patented July 20, 1880.

WITNESSES:
A. Schehl.
C. Sedgwick

INVENTOR:
A. K. Munson
BY Munn & Co
ATTORNEYS.

UNITED STATES PATENT OFFICE.

ADEN K. MUNSON, OF MARYSVILLE, KANSAS.

NECK-YOKE.

SPECIFICATION forming part of Letters Patent No. 230,328, dated July 20, 1880.

Application filed April 14, 1880. (No model.)

*To all whom it may concern:*

Be it known that I, ADEN K. MUNSON, of Marysville, in the county of Marshall and State of Kansas, have invented a new and Improved Neck-Yoke for Plow-Horses, of which the following is a specification.

The object of this invention is to provide a yoke to be used with a pair of horses in driving a plow, whereby the horse in the furrow may at all times control the tongue and guide the plow, while the horse on the land can pass around any obstruction and come in place again without changing the direction of the plow.

The invention consists of a yoke having one arm twice as long, or thereabout, as the other arm from the point of attachment of the said yoke to the tongue of the plow, and having on the long arm a long staple, which permits the movement of the ring, to which ring the land-horse is attached.

Figure 1:
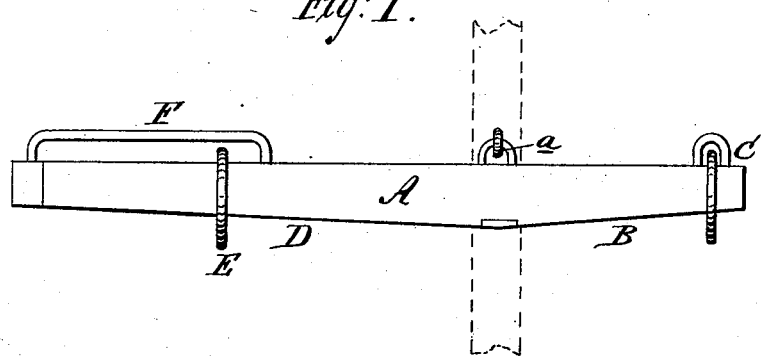
Figure 2:
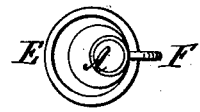

Figure 1 is a plan of the yoke. Fig. 2 is an end view of the same.

Similar letters of reference indicate corresponding parts.

In the drawings, A represents the yoke, provided with a staple, $a$, and an eyebolt, $b$, the latter of which secures the said yoke to the tongue of the plow.

B represents the short arm of the yoke, to which are secured the staple and ring C, to which the furrow-horse is attached; and D represents the long arm, to which is secured the ring E, to which the land-horse is attached.

F is a long staple secured longitudinally along the long arm of the yoke over the ring E, to permit the movements of the latter.

This yoke is very useful in plowing in corn-stalk ground, where the rows of old corn-stalks come in the place where the land-horse would naturally walk. The sliding ring E on the long arm of the yoke permits the land-horse to walk outside of the stalk-row, the horse in the furrow at the same time controlling the plow, and the direction of the plow is not changed. This prevents the horses from sidling about and keeps the furrow always straight, and of course, therefore, the work is better performed.

By the use of the neck-yoke the tongue of a sulky-plow can be made rigid and straight, and will work with proper effect.

Having thus described my invention, I claim as new and desire to secure by Letters Patent—

The combination, with the yoke A, connecting with the plow-tongue at $a$, to form unequal arms, of the ring in a short staple near the end of the short arm B, and a ring sliding in a long staple or keeper, F, of the long arm, as and for the purpose specified.

ADEN K. MUNSON.

Witnesses:
JAMES H. BLOSKER,
H. W. HAGAR.